United States Patent [19]
Unger et al.

[11] Patent Number: 5,740,887
[45] Date of Patent: Apr. 21, 1998

[54] DRIVE SYSTEM FOR VERTICAL MAST PERSONNEL LIFT

[75] Inventors: Mark R. Unger, Hagerstown, Md.; Brian M. Boeckman, Chambersburg, Pa.

[73] Assignee: JLG Industries, Inc., McConnellsburg, Pa.

[21] Appl. No.: 588,371

[22] Filed: Jan. 18, 1996

[51] Int. Cl.$^6$ ............................................. B66F 9/06
[52] U.S. Cl. ..................................... 187/231; 180/65.5
[58] Field of Search ............................ 187/222, 231, 187/232, 240, 244; 180/65.5, 234, 242

[56] References Cited

U.S. PATENT DOCUMENTS

| | | | |
|---|---|---|---|
| 3,817,346 | 6/1974 | Wehmeyer | 182/14 |
| 4,258,825 | 3/1981 | Collins | 182/14 |
| 4,375,840 | 3/1983 | Campbell | 180/6.5 |
| 4,511,015 | 4/1985 | Purdy | 182/2 |
| 4,683,973 | 8/1987 | Honjo et al. | 180/252 |
| 5,174,593 | 12/1992 | Chapman | 280/47.11 |
| 5,203,425 | 4/1993 | Wehmeyer | 182/19 |
| 5,222,568 | 6/1993 | Higasa et al. | 180/65.6 |
| 5,547,038 | 8/1996 | Madwed | 180/65.5 |

*Primary Examiner*—Kenneth Noland
*Attorney, Agent, or Firm*—Foley & Lardner

[57] ABSTRACT

A drive system for a vertical mast personnel lift uses a pair of rear wheels that are fixed in an axial direction of a base portion of the personnel lift. When an operator input to make a turn is received, DC motors respectively connected to the right and left rear wheels are rotated at a different rate. Neither the front wheels nor the rear wheels are steered during the turning movement. The front wheels are configured as caster wheels, which are free to turn in any direction. In order to rotate the personnel lift about its central axis, the right rear wheel is rotated at a first rate in a first direction, and the left rear wheel is rotated at the first rate in a second direction opposite the first direction.

24 Claims, 11 Drawing Sheets

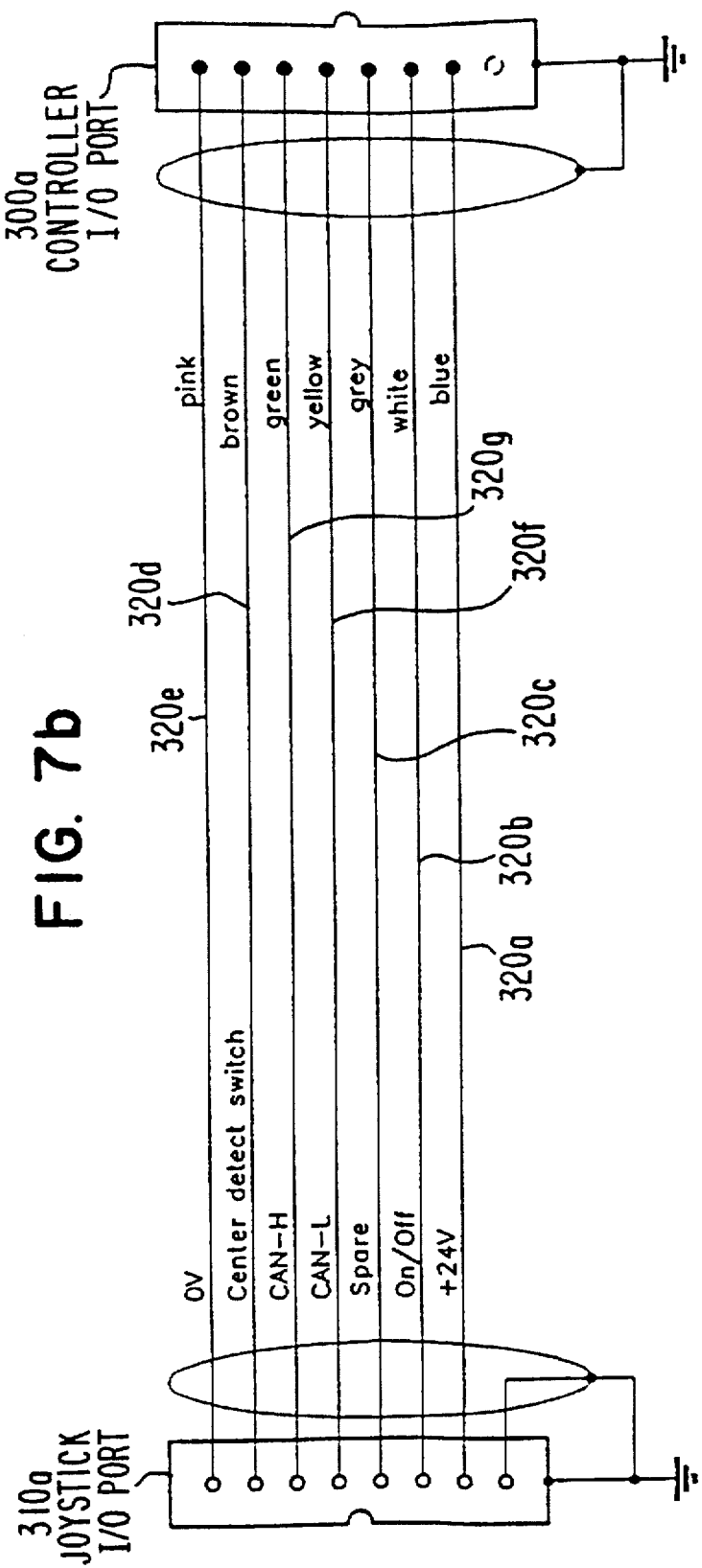

DRIVE SYSTEM FOR VERTICAL MAST PERSONNEL LIFT

BACKGROUND OF THE INVENTION

1. Field of the Invention

The invention relates to a rear-wheel drive system for a vertical mast personnel lift. More particularly, the invention relates to a system which supplies an appropriate amount of power to a left wheel drive motor and to a right wheel drive motor in order to allow for a full range of drive and steering movement of the personnel lift.

2. Description of the Related Art

Work Platforms are utilized for a variety of different reasons, including: a) loading and unloading of items in a warehouse, and b) repairing components located at a particular height above the ground, such as repairing a broken ceiling light in a gymnasium. FIG. 1a shows a conventional personnel lift platform which can be used at a warehouse, for example. The personnel lift platform 10 can be used to move a worker to a particular location as the platform 10 is raised or lowered to a particular height. The platform 10 includes a base portion 20 and a vertically movable platform portion 30.

The vertically movable platform portion 30 is moved up or down via heavy-duty extruded aluminum mast sections with ultra high molecular weight polyethlene (UHMW-PE) slide guides 50.

One important aspect of lift platforms is the control of the movement of the movable platform portion 30 with respect to the base portion 20. Typically, this is done by monitoring inputs by an operator, and by raising or lowering the movable platform 30 or driving the work platform 10 based on the particular operator input. FIG. 1b shows the same work platform 10 as in FIG. 1a, but with the movable platform 30 being fully extended.

U.S. Pat. No. 4,258,825, invented by Pat Collins, shows a compact powered manlift car system used to support an operator at different heights. The power driven front and rear steering assemblies allow the front and rear wheels to be steered independently of one another.

U.S. Pat. No. 4,375,840, invented by Campbell, shows a drive/steer system for a mobile support which is readily maneuverable in all horizontal directions. The drive/steer system is achieved by steering the drive wheels.

U.S. Pat. No. 4,683,973, invented by Honjo et al., shows a three- or four-wheel drive and steer system in which all wheels are both driven and steered.

U.S. Pat. No. 3,817,346, invented by Wehmeyer, shows a conventional drive and steer system in which the front wheels steer and the rear wheels drive. In this system, the entire unit can be controlled from a scaffolding platform with a single lever that activates the lift, drive and steering motors.

U.S. Pat. No. 5,203,425, invented by Wehmeyer, which is incorporated herein by reference, shows a conventional push-around personnel lift device. The telescoping mast includes a plurality of tee slots to allow for retraction and extension of the cab portion of the lift device.

U.S. Pat. No. 5,174,593, invented by Chapman, shows a steering system that is either steered or changed to allow for crab steering. The front and rear wheels can be independently steered with respect to each other.

U.S. Pat. No. 5,222,568, invented by Hisaga et al., shows a drive system for an electric vehicle, in which four independent electric motors are used to move the four wheels of the vehicle.

In each of the above-mentioned systems, in order to effect a turning movement of the lift device, the drive wheels must be steered in a particular direction. It is desirable to achieve a drive system for a vertical personnel lift in which the drive wheels are not steered in order to effect a turning movement of the vertical personnel lift.

SUMMARY OF THE INVENTION

It is an object of the invention to provide a drive system for a vertical personnel lift in which the drive wheels do not have to be steered in order to move the lift in a particular direction.

This and other objects are accomplished by a drive control system for a personnel lift having a base portion and a movable portion. The drive control system includes a left and a right rear wheel located on a bottom surface of the base portion and fixed to rotate about a single axis, with the single axis being substantially aligned with the width of the base portion. The drive control system also includes a left and a right DC motor respectively connected to the left and the right rear wheels and configured to provide rotational movement of the left and the right rear wheels. The left and right DC motors are actuated to cause rotation of the left and right rear wheels in such a manner to cause steering of the personnel lift without steering either the left or the right rear wheels.

In another embodiment of the invention, a drive control system for a personnel lift having a base portion and a movable portion is provided, which includes a left and a right rear wheel located on a bottom surface of the base portion fixed to rotate about a single axis. The single axis is substantially aligned with the width of the base portion. The drive control system also includes a left and a right DC motor respectively connected to the left and the right rear wheels and configured to provide rotational movement to the left and the right rear wheels. The drive control system further includes a left and a right caster wheel located on the bottom surface of the base portion and configured to move in any direction, with the left and right caster wheels acting as front wheels for the personnel lift. The left and right DC motors are actuated to cause rotation of the left and right rear wheels in such a manner to cause steering of the personnel lift without steering either the left or the right rear wheels. Also, the left and right caster wheels are free to rotate during the steering of the personnel lift.

In yet another embodiment of the invention, a method for moving a personnel lift having a base portion and a movable portion is provided. The personnel lift includes a left rear wheel and a right rear wheel fixed in a direction of movement with respect to the base portion. The method includes a step of receiving an operator input of a desired driving movement of the personnel lift. The method also includes a step of sending a first signal to a first DC motor coupled to the left rear wheel and a second signal to a second DC motor coupled to the right rear wheel to cause the desired driving movement in response to the received operator input. As a result, the left and right front wheels of the personnel lift are not controlled during the driving movement.

BRIEF DESCRIPTION OF THE DRAWINGS

These and other objects and advantages of the invention will become more fully apparent from the following detailed description when read in conjunction with the accompanying drawings, with like reference numerals indicating corresponding parts throughout, wherein:

FIG. 7b is a diagram of the control lines between the platform control station and the controller module according to the invention.

DETAILED DESCRIPTION

In the system according to the invention, the direction of each of the rear wheels is fixed with respect to the base frame of the personnel lift. The right front wheel and the left front wheel are configured as caster wheels, and are free to swivel in any direction. Neither the front wheels nor the rear wheels are steered in the system according to the invention.

Figure 1A:
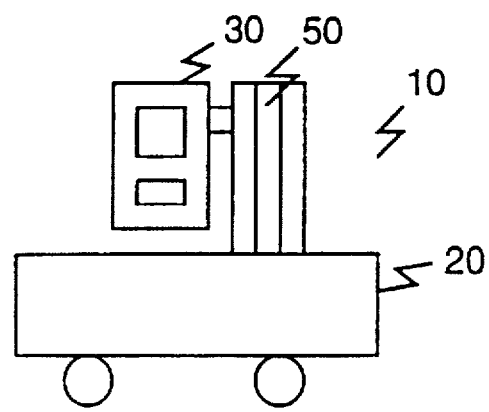
FIG. 1a depicts a vertical mast personnel lift in a fully retracted position.
Figure 1B:
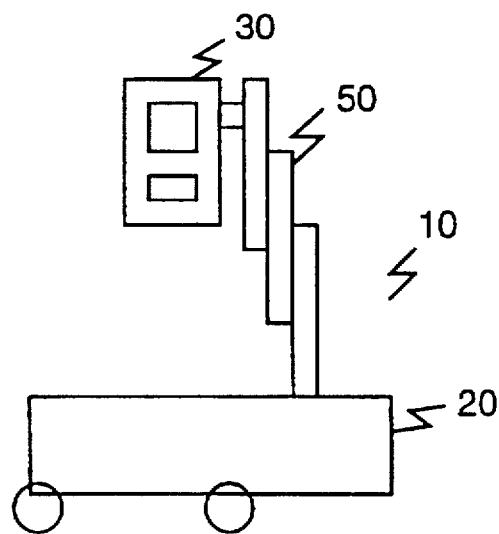
FIG. 1b depicts a vertical mast personnel lift in a fully extended position.
Figure 2A:
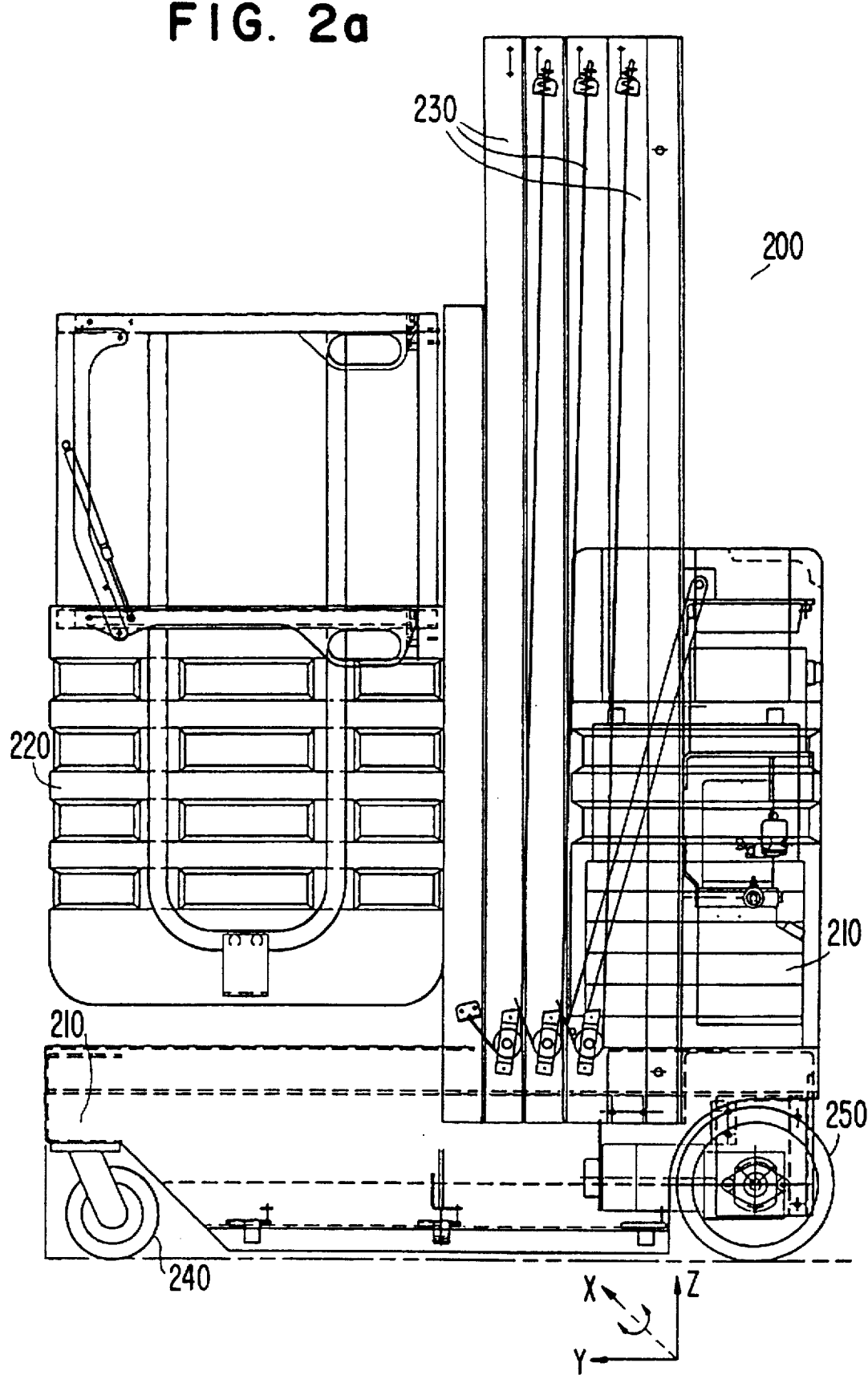
FIG. 2a depicts a side view of a vertical mast personnel lift according to the invention.
Figure 2B:
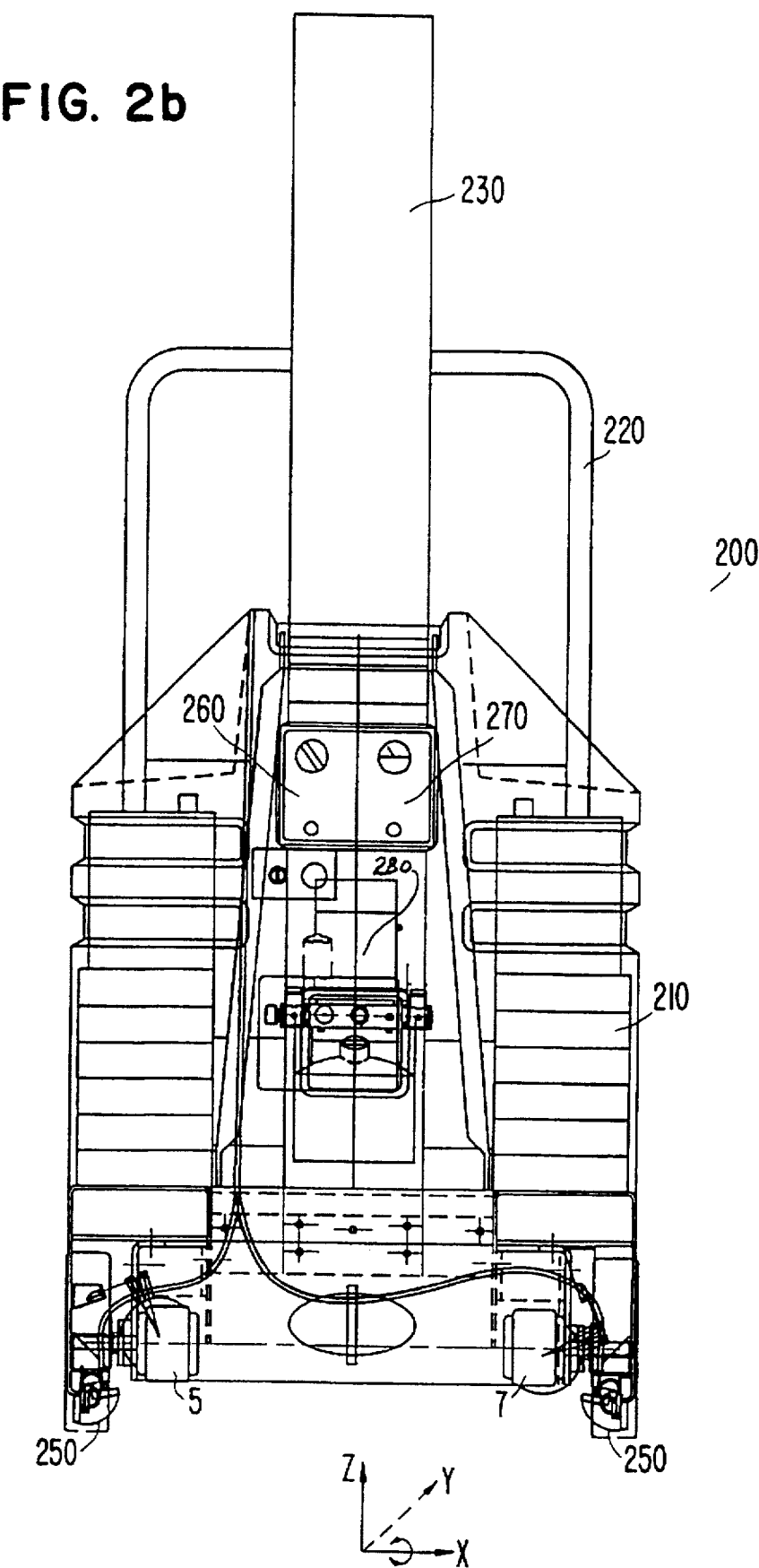
FIG. 2b depicts a rear view of the vertical mast personnel lift according to the invention.
Figure 2C:
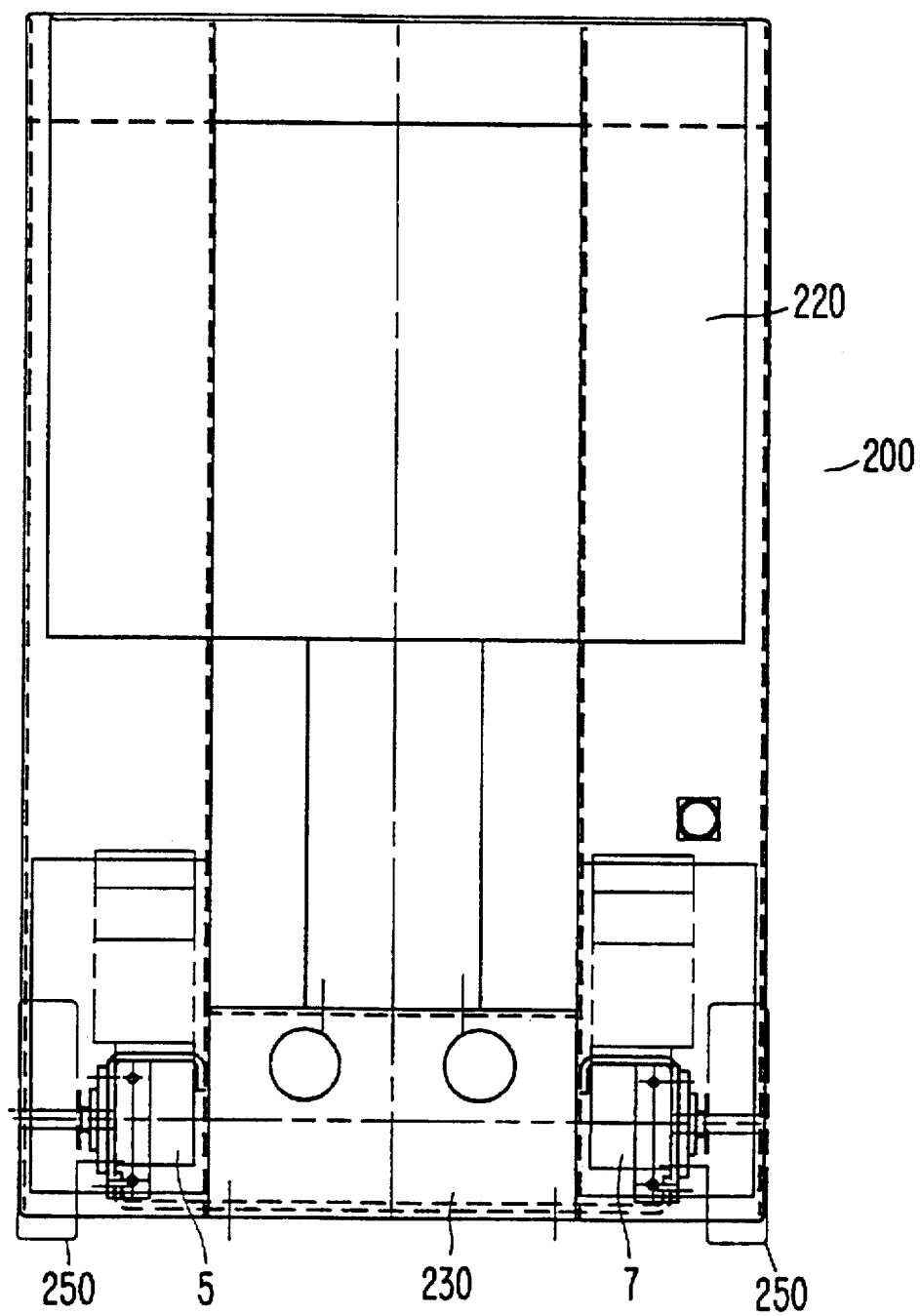
FIG. 2c depicts a top view of the vertical mast personnel lift according to the invention.

Referring now to FIGS. 2a, 2b, and 2c, there is shown a vertical mast personnel lift 200 of the system according to the invention in a side view, a back view and a top view, respectively. The personnel lift 200 includes a base portion 210, in which a ground control station (not shown) is located. The personnel lift also includes a movable portion 220, which can be moved either up or down. The movable portion 220 is where a platform control station (not shown) is located. The movable portion 220 is shown in its fully retracted position in FIGS. 2a and 2b. A plurality of aluminum mast sections 230 are lifted proportionally with respect to each other to cause the movable portion 220 to move in a vertical direction when in the lift mode. The mast sections 230 are connected to each other via gears and pulleys, as is done in conventional vertical mast personnel lifts.

The front wheels 240 are fully rotatable caster wheels, and the rear wheels 250 rotate only in the x-axis direction, as best seen from FIG. 2b. The x-axis direction corresponds to the direction of the wheel axles, which also corresponds to the width of the base portion 210. The rear wheels 250 are fixed (i.e., cannot be moved) with respect to the y-axis (axis corresponding to the length of base portion 210) and the z-axis (axis corresponding to the height of personnel lift 200). FIG. 2a is a side view of the personnel lift 200, with the x-axis being in the direction of the sheet of paper. FIG. 2b is a back view of the personnel lift 200, with the y-axis being in the direction of the sheet of paper. FIG. 2c is a top view of the personnel lift 200, with the z-axis being in the direction of the sheet of paper.

A battery 260 and charger 270 are located at a back side of the base portion 210, as seen from FIG. 2b. The pump motor 280 is also located at the back side of the base portion 210.

Figure 2D:
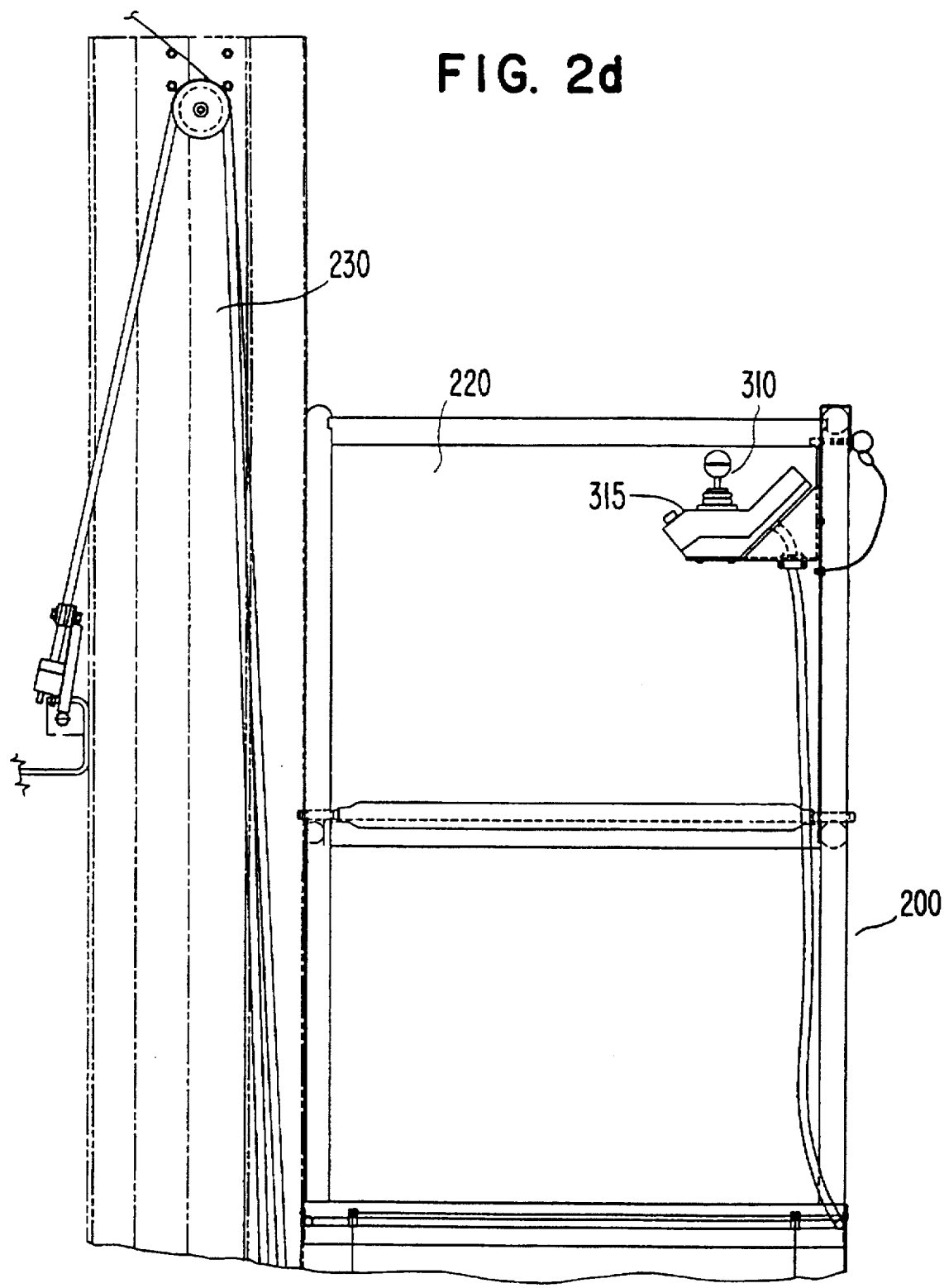
FIG. 2d depicts the location of the platform control station on the vertically movable platform portion of the vertical mast personnel lift.

FIG. 2d shows the location of the platform control station 315 on the movable lift portion 220 of the personnel lift 200. The platform control station 315 is located so as to provide ease of access for an operator situated at the movable lift portion 220.

By applying an appropriate pulse-width modulated (PWM) signal to the respective DC motors 5, 7 for the left and right rear wheels, the personnel lift system will be able to turn in any desired direction, with the front caster wheels providing stability (but no turning movement) for the system.

Personnel lifts of the type shown in FIGS. 1a and 1b and FIGS. 2a, 2b and 2c are typically used in areas that require repair work or construction at a particular elevation, such as a working height of 16 feet or higher. These areas are typically compact, and so a personnel lift is required that is both compact and highly maneuverable.

Figure 3:
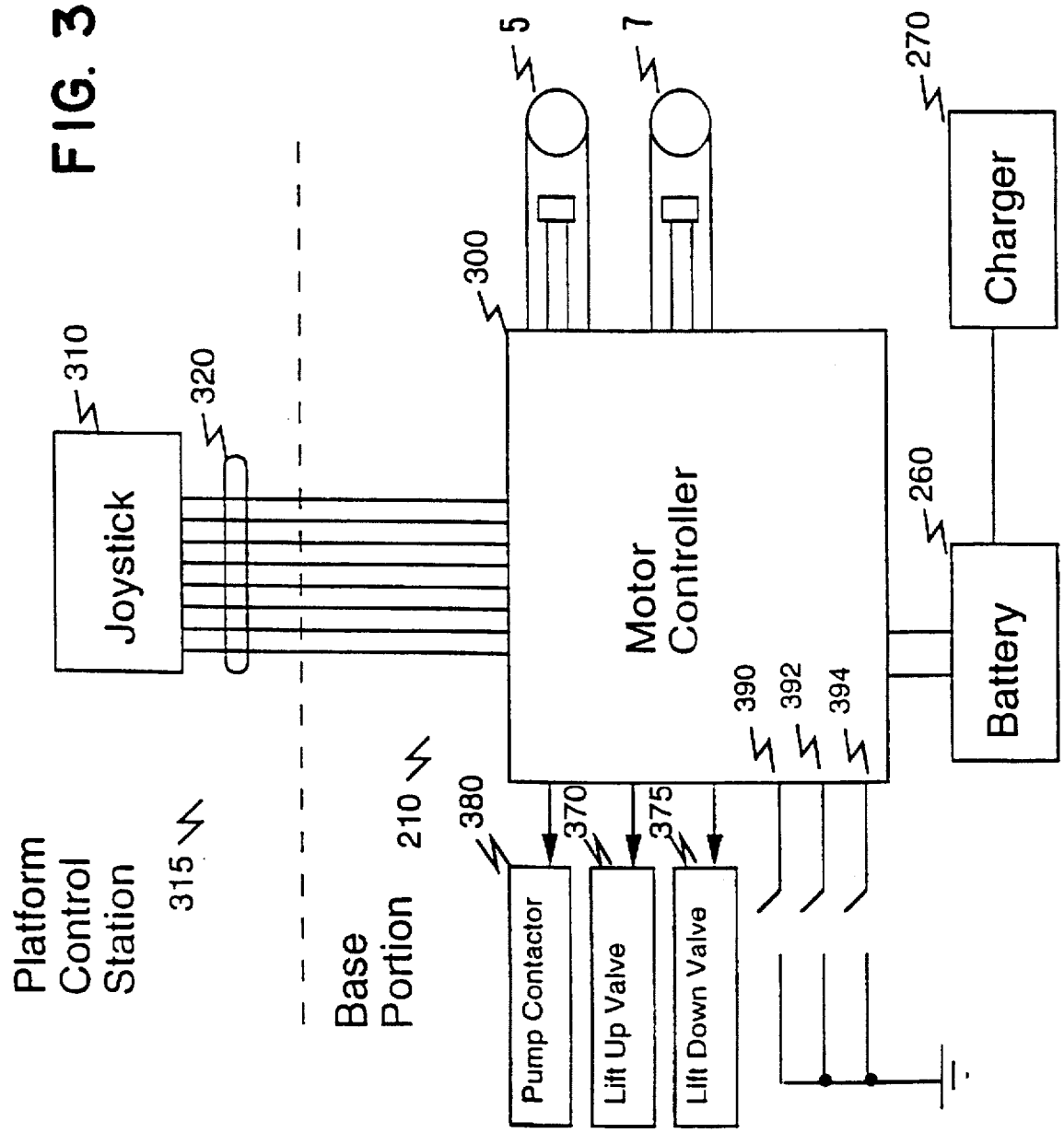
FIG. 3 is a block diagram of the connectivity between the platform control station and the controller module according to the invention.

A block diagram for such a vertical mast personnel lift of the system according to the invention is shown in FIG. 3. The system includes two electric drive motors 5, 7 that provide both drive and steering for the personnel lift. Each motor is controlled independently by a controller module 300, which makes the personnel lift highly maneuverable. Also, since the driving of the personnel lift is accomplished by electric motors, rather than by hydraulic pumps and a motor as in conventional systems, the personnel lift is very energy efficient.

As shown in FIG. 3, the controller module 300 receives input control signals from a joystick 310, located at a platform control station 315 in the movable portion 220 of the personnel lift 200. Based on these inputs, the controller module 300 outputs respective first and second PWM signals to the left rear wheel DC motor 5 and the right rear wheel DC motor 7. For example, if the operator moves the joystick to the left in order to start a left turning motion, signals representative of this joystick movement are inputted to the controller module 300 via control lines 320. Based on these inputs, the controller module 300 outputs a first PWM signal to the DC motor 5 for controlling the rate of rotation of the left rear wheel, and a second PWM signal to the DC motor 7 for controlling the rate of rotation of the right rear wheel. In order to create a left turn, the DC motor 7 for the right rear wheel will rotate faster that the DC motor 5 for the left rear wheel, and so the right wheel will also turn faster than the left wheel. This causes the desired left turning motion. The amount that the DC motors 5, 7 differ in their respective rotational speeds will cause a desired turning ratio (e.g., sharp right turn or gradual right turn). Also, if the DC motors 5, 7 move at the same rotational speed, then the personnel lift will move in either a forward direction or a reverse direction, depending on which direction the DC motors 5, 7 are rotated. Similarly, if the motors 5, 7 move at the same speed but motor 5 moves in an opposite direction with respect to 7, then the lift will rotate or revolve about its center position.

FIG. 3 also shows a battery 260 which provides DC power to the controller module 300, as well as a charger 270 provided to periodically charge the battery 260.

The controller module 300 also receives various operator inputs in addition to the joystick input. These inputs can be made from either a ground control station located at the base portion 210 of the personnel lift 200 or from a platform control station (or module) 315 located at the movable lift portion 220 of the personnel lift 200. Based on these inputs, a lift up valve 370 may be actuated, a lift down valve 375 may be actuated, and/or a pump contactor 380 may be actuated. Each of these outputs are used in moving the movable lift portion 220 in a vertical direction.

The motor controller 300 also receives various sensed inputs, including a drive cutout input 390, a speed cutback input 392, and a brake status input 394. Based on these sensed inputs, a desired operator input for causing drive or lift movement of the personnel lift 200 may be either allowed, cut back to some extent, or disallowed in its entirety.

Figure 4:
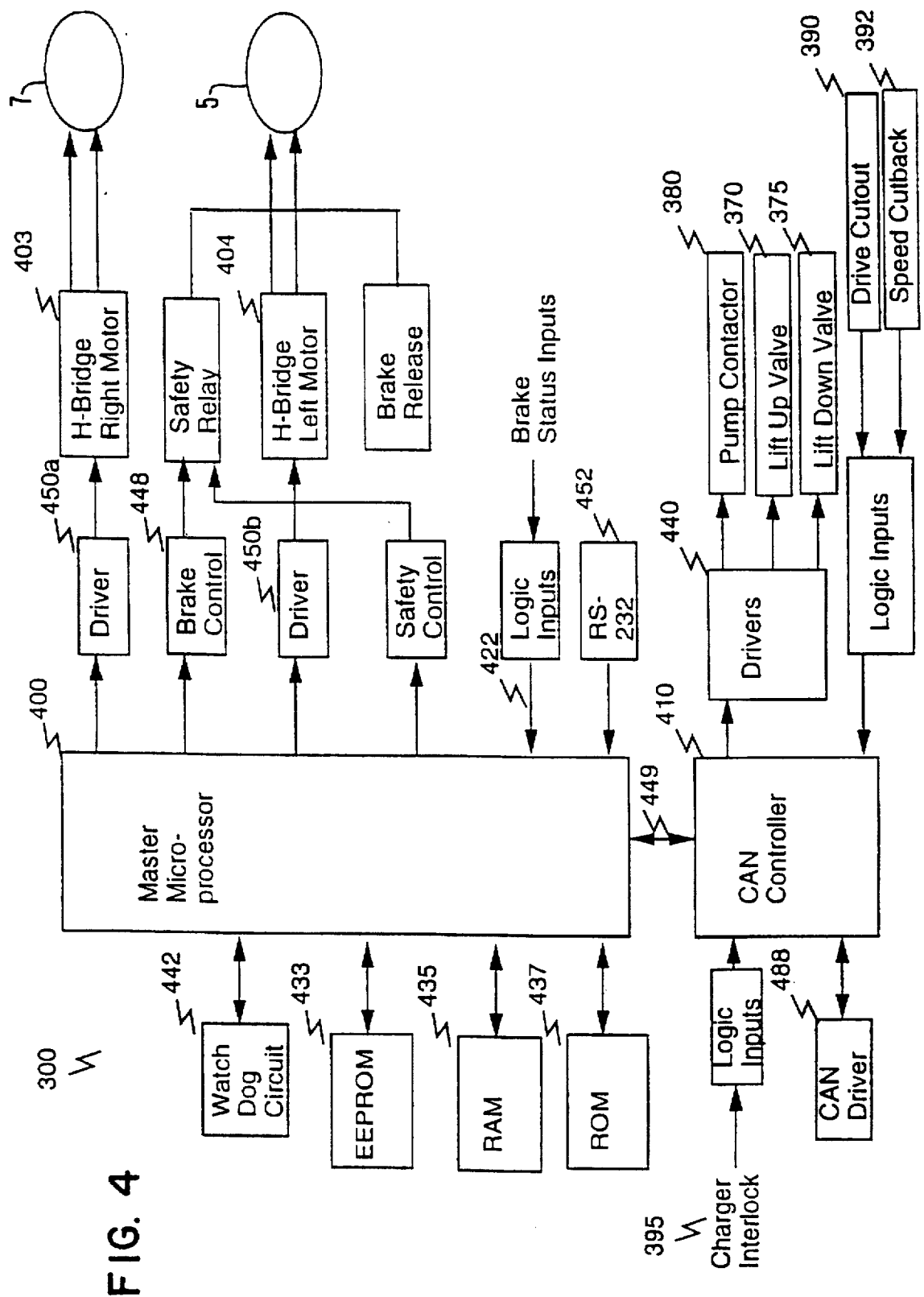
FIG. 4 is a block diagram of the controller module according to the invention.
Figure 5:
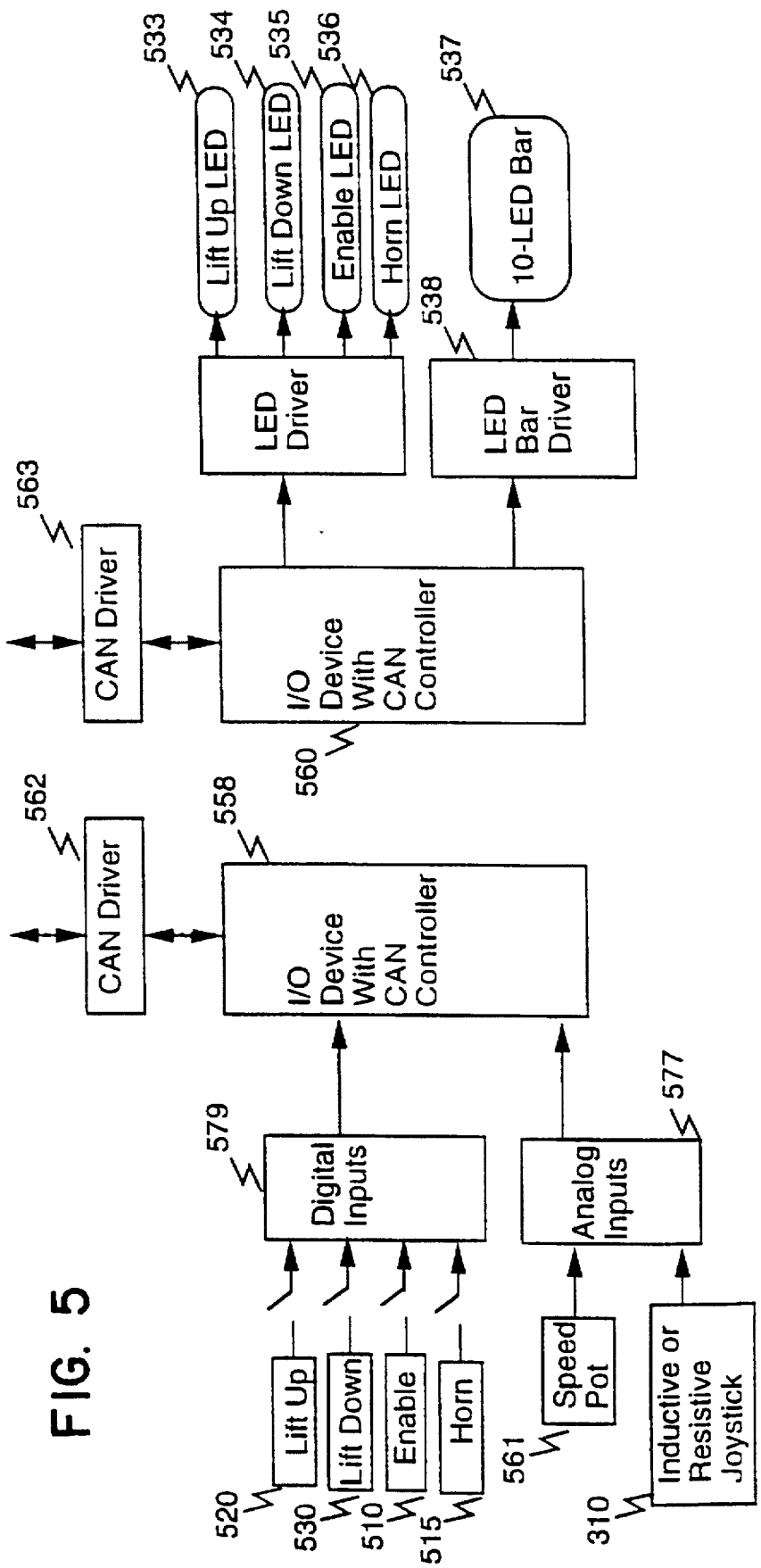
FIG. 5 is a block diagram of the platform controller module according to the invention.
Figure 6:
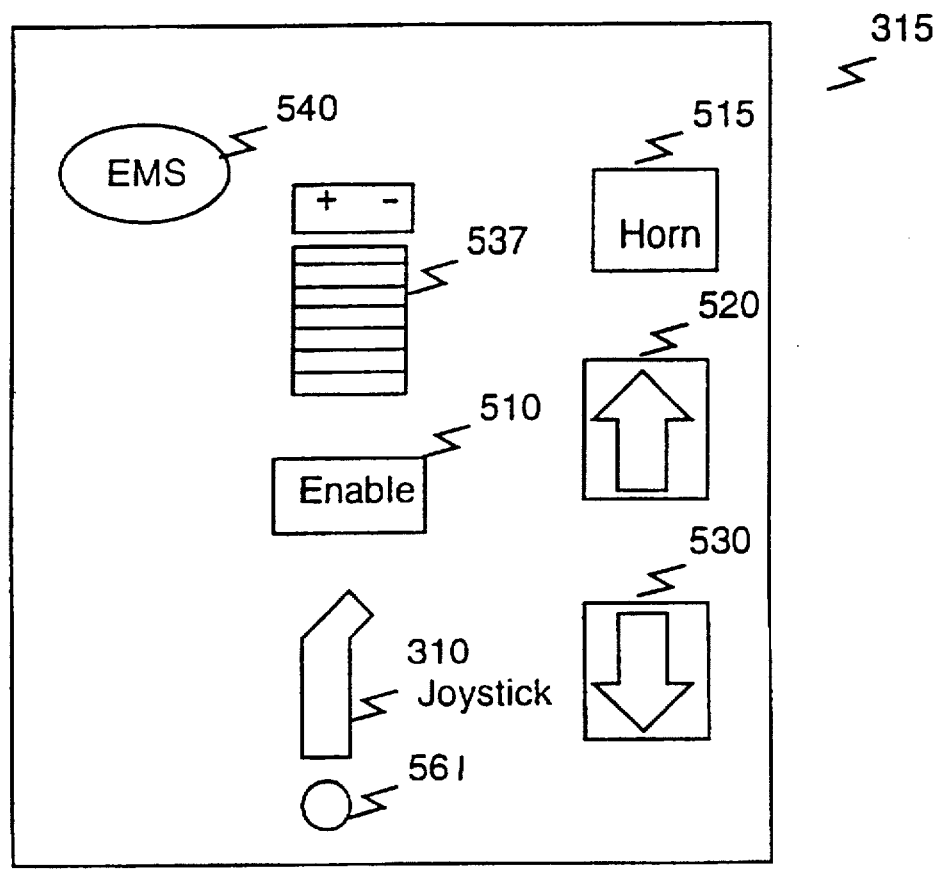
FIG. 6 is a diagram of the components of the platform control module housed in the movable portion of the personnel lift according to the invention.

As shown in FIG. 4, the controller module 300 includes a master processor 400, a CAN (Controller Area Network) Controller 410, two full bridges 403, 404, a lift control driver 440 and drive control drivers 450a, 450b. As shown in FIG. 5, the platform control module 315 sends and receives data to and from the master processor 400 of the controller module 300 via a CAN Network. The platform control module 315 also includes an enable button 510, a lift up button 520, a lift down button 530, an emergency stop button 540, and a joystick 310 with a speed control knob (potentiometer) 561. A diagram of the platform control station 315 is shown in FIG. 6, which shows the layout of the buttons and joystick 310 on the platform control station 315.

In one example of the system according to the invention, the drive motors 5, 7 are permanent magnet DC motors with integral worm gear and parking brake. In the preferred embodiment, the DC motors are right angle worm drive 50:1 motors, manufactured by Bodine Manufacturing, which can be braked dynamically. Of course, other types of DC motors can be utilized in the system according to the invention. Alternatively, the motors for driving the left and right rear wheels 250 may be configured as AC motors. The controller module 300 takes inputs from the platform control module 315 and provides for a smooth acceleration and deceleration of the drive motors 5, 7 in order to give the operator a comfortable feel when driving the personnel lift 200 in a forward or reverse direction or when moving the movable lift portion 220 either up or down. The rate of acceleration and deceleration is software adjustable.

FIG. 4 gives a more detailed block diagram of the controller module 300. The controller module 300 includes a master processor 400 and a CAN controller 410. The master processor 400 is connected to memory devices, which includes an EEPROM 433, a RAM 435, and a ROM 437. These memory devices store the required operating software for the master processor 400. The master processor 400 is also coupled to a watch dog timer circuit 442 which provides the master processor 400 with appropriate timing signals used primarily for fault detection, as will be discussed further herein. The master processor 400 outputs control signals to a first driver 450a. The first driver 450a is connected to an H-bridge 403 for the right DC motor 7. The H-bridge 403 for the right DC motor 7 is actuated via the control signals output from the master processor 400 through the first driver 450a.

The master processor 400 also outputs control signals to a second driver 450b. The second driver 450b is connected to an H-bridge 404 for the left DC motor 5. The H-bridge 404 for the left DC motor 5 is actuated via the control signals output from the master processor 400 through the second driver 450b. In the preferred embodiment, the full bridges 403, 404 are MOS-FET full bridges, but other types of full bridges may be utilized and still keep within the scope of the invention.

The master processor 400 outputs a brake control signal to the brake control device 448 to activate or deactivate brakes 444, 446 (see FIG. 7a) of the personnel lift 200.

Referring back to FIG. 4, when the joystick 310 is not activated (i.e., when it is in the center or neutral position), then the parking brake for the personnel lift is automatically activated by control signals output from the master processor 400.

The master processor 400 receives logic inputs indicative of the brake status via line 422, which indicate whether the manual override of the parking brake has been activated or not. The parking brake is set by a spring, and it is released electrically. The parking brake can also be released by manually overriding the parking brake. When the joystick is in the neutral position, the parking brake is automatically set. However, the operator can manually override the parking brake when the joystick is in the neutral position. In this case, if a lift up or drive mode is selected, the controller 600 will output a warning to the operator, and will not allow the lift up or drive mode to occur until the controller 600 receives a signal indicating that the manual override of the parking brake has been reset.

The controller also monitors the current and resistance of the motors 5, 7. Based on these monitored values, the controller 600 will either increase or decrease the voltage and/or the current to the motors 5, 7, as needed, and it will also reverse the polarity of the PWM signals sent to the motors 5, 7, as needed, in order to maintain the operator-selected drive speed. For example, if the personnel lift is going down a ramp, the controller 600 will sense the increases motor speed as the personnel lift gathers speed down the ramp, and the controller 600 will send appropriate signals to the motors 5, 7 in order to maintain the operator-selected drive speed.

The master processor 400 is also configured to connect to another computer device (not shown) via an RS-232 interface port 452, to allow for ease in reprogramming the controller module 300 by any standard computer.

The controller module 300 also includes a CAN controller 410, which provides an interface to the platform control module 315. The CAN controller 410 and the platform control module 315 communicate with each other via a Controller Area Network (CAN) Bus. The CAN Bus incorporates a protocol used extensively in the automotive industry, and which is very similar to the RS-232 protocol structure. The CAN controller 410 communicates with the platform control module 315 through a CAN driver 488. The CAN controller 410 relays these received signals to the master processor 400 via signal lines 449 so that the master processor 400 can determine whether an operator input for a desired personnel lift movement (either lift or drive) will be allowed in one form or another.

The CAN controller 410 outputs signals via drivers 440 to the pump contactor 380, the lift up valve 370, and the lift down valve 375. The CAN controller 410 also receives several sensed logic inputs, including the drive cutout input 390, the speed cutback input 392 and the charger interlock input 395. These sensed logic inputs are relayed to the master processor 400 via signal lines 449.

A more detailed block diagram of the platform control module 315 is given in FIG. 5. The joystick 310 is a multi-axis device, which can be positioned in any angular direction from a neutral, center position. The joystick 310 is also spring-loaded, so that it will return to the center, neutral position when the operator releases it. Further, the joystick 310 may be positioned at any of a plurality of distances away from its center position in order to effect a particular rate of drive movement of the personnel lift 200. That is, if the joystick 310 is held at a position slightly forward with respect to the neutral position when the personnel lift 200 is in the drive mode, the personnel lift 200 is driven forward at a first rate of speed, for example, ¼ mile per hour. If the joystick 310 is held at a maximum forward position with respect to the neutral position when the personnel lift 200 is in the drive mode, the personnel lift 200 is driven forward at a second rate of speed, for example, 2 miles per hour, which is greater than the first rate of speed. The joystick 310 can be constructed as either an inductive device (i.e., resolver) or a resistive device (i.e., potentiometer).

Referring now to FIG. 5, the platform control module 315 includes an I/O Device with CAN Controller I (Device I) 558 and an I/O Device with CAN Controller II (Device II) 560. Device I receives various operator inputs, such as the inductive or resistive input indicative of a particular movement of the joystick 310, and an input from the speed potentiometer 561. Each of these inputs are analog inputs, and pass through an analog input port 577 to Device I. Device I also receives various operator inputs, including a lift up input 520, a lift down input 530, an enable input 510, and a horn input 515. Each of these inputs corresponds to a respective push button on the platform control station 315 (see FIG. 6), and when pushed, a respective signal is received by the digital input port 579 and passed on to Device I. Device I converts each of these signals to be compatible with the CAN protocol, and outputs these signals on CAN bus lines to the transmit CAN Driver 562. The output of the transmit CAN driver 562 is sent to the CAN Controller 410 of the controller module 300, as shown in FIG. 4.

Referring back to FIG. 5, Device II receives signals from the controller module 300 over the CAN bus via the receive CAN driver 563. These signals may cause various warning lights to be activated on the platform control station 315 if the controller module 300 determines that the personnel lift 200 is operating in a certain unsafe condition. For example, if the lift up button is held down, then that input is sent from Device I to the controller module 300. The controller module 300 determines if the lift up mode should be allowed, and if so, it sends a lift up signal to Device II, as well as sending appropriate signals to open the lift up valve 370 (see FIG. 5). Based on the signal received by Device II from the controller module 300, Device II will send a signal to cause the lift up LED 533 to light up. Device II also controls the lift down LED 534, the Enable LED 535, the Horn LED 536, and the 10-LED-Bar 537 (via the LED Bar Driver 538) which indicates the battery charging condition and warn/fault codes.

The controller module 300 in the system according to the invention is an adaptation of a controller module used in the wheelchair industry. In the preferred embodiment, the controller module 300 is a ZAUGG MC-1 module, built by Curtis & Zaugg, and which incorporates the CAN bus technology. Of course, other types of controller modules that use the CAN bus technology can be utilized in the system according to the invention.

Figure 7A:
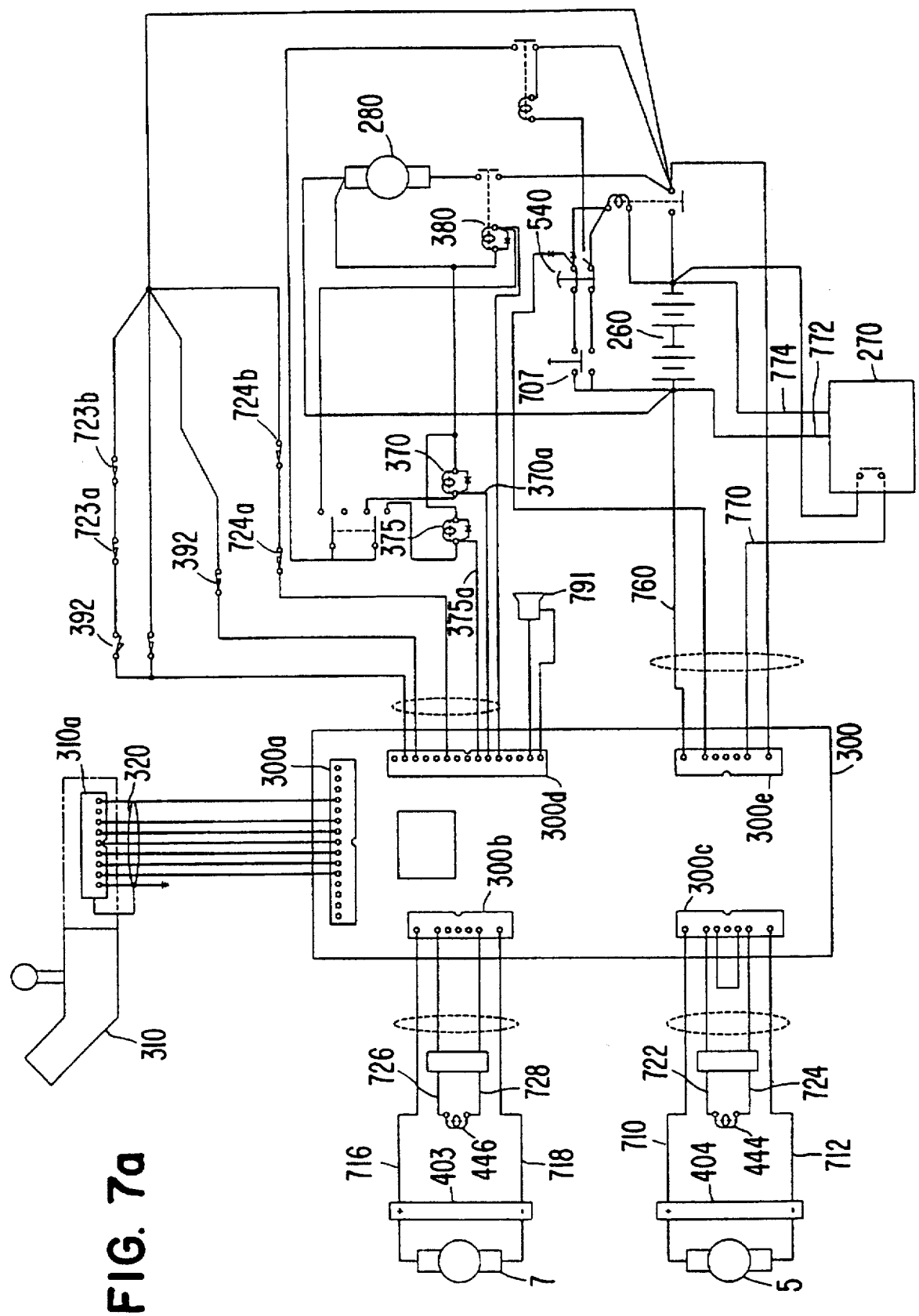
FIG. 7a is a schematic diagram of the connectivity of drive and lift components according to the invention.

A schematic diagram of the system according to the invention is shown in FIG. 7a. The platform control module 315 communicates with the controller module 300 via control lines 320. Referring now to FIG. 7b, control lines 320 include a voltage supply line 320a, preferably a 24V line. Control lines 320 also include an ON/OFF line 320b, a spare line 320c, a Center Detect line 320d, a 0V line (ground) 320e, a CAN-L line 320f, and a CAN-H line 320g. The controller module 300 has an I/O port 300a that connects to an I/O port 310a of the joystick 310. The controller module 300 also has an I/O port 300b that connects to the right DC motor 7, an I/O port 300c that connects to the left DC motor 5, an I/O port 300d that connects to the sensed input limit switches, the lift up and down valves, and an external horn, and an I/O port 300e that connects to the battery 260 and charger 270 (see FIG. 7a).

Referring back to the connection between the controller module 300 and the joystick 310 as given in FIG. 7b, the 24V line 320a and the 0V line 320e supply the necessary high and low (ground) voltages for the platform control module 315. The ON/OFF line 320b is used to determine whether the platform control module 315 is turned on or off. Line 320c is reserved as a spare for future use. One possibility is to use line 320c as an emergency flash line, which would cause a warning light on the platform control module 315 to light up when a safety hazard condition is sensed by the controller module 300. The Center Detect line 320d is an output of the platform control module 315, and it outputs a signal indicative of whether the joystick 310 is in its center position or not; i.e., whether or not the joystick 310 has been stroked.

The CAN-L line 320f and the CAN-H line 320g are two bi-directional CAN protocol lines used to transmit information back and forth between the controller module 300 and the platform control module 315. Each of these CAN lines transmit signals within a range from 0 volts to 5 volts, at a rate of about 100 kHz. For example, if a fault is determined by the controller module 300, this information will be sent to the platform control module 315 via one of the CAN-H and CAN-L lines, thereby causing a warning light to turn on at the platform control module 315. Further, if the joystick 310 is moved in the right forward direction (i. e., 2 o'clock direction as seen from above the joystick 310), information indicative of a desired right turn will be sent to the controller module 300 via the CAN-L and CAN-H lines. Also, if the lift up button is pushed, this information will also be sent to the controller module 300 over the CAN bus lines.

FIG. 7a also shows the connectivity between the controller module 300 and the left and right motors 5,7. The controller module 300 outputs pulse width modulated (PWM) signals on lines 710, 712 to the left motor 5, and it outputs PWM signals on lines 716, 718 to the right motor M7. Based on these signals, the rate of rotation of the DC motors 5,7 is controlled, and the direction of rotation of the DC motors 5,7 is controlled. The controller module 300 also outputs brake signals on lines 722, 724 to the brake 444 for the left motor 5, and it outputs brake signals on lines 726, 728 to the brake 446 for the right motor 7. The watch dog circuit 442 (see FIG. 4) monitors the microprocessor for malfunctions.

Referring back to FIG. 7a, the controller module 300 also controls the opening and closing of the lift up valve 370 and the lift down valve 375 via lines 370a, 375a, respectively. The controller module 300 receives sensed inputs from the speed cutback limit switch 392, the brake limit switches 723a, 723b, and the ground control clearance limit switches 724a, 724b. The controller module 300 is connected to a 24 V battery 260 via line 760, and also to a charger 270 via line 770. The charger 270 is connected to the battery 260 via lines 772, 774.

A key switch 707 is located at the ground control station, and it can be set to one of three positions: a) platform, b) ground, and c) off. When the key switch 707 is in the platform position, only inputs received by the controller module 300 from the platform control station 315 will be used to control the personnel lift 200. Similarly, when it is in the ground position, only inputs received from the ground control station will be used to control the personnel lift 200. When the key switch 707 is in the Off position, the personnel lift 200 cannot be operated from either control station.

The controller module 300 also outputs a signal to actuate an external horn 791 when a horn button 575 is pushed by the operator at the platform control station 315. This input is received by the controller module 300 via the CAN-L and CAN-H lines 320f, 320g.

The functionality of the drive and steer system of the personnel lift according to the invention will now be described in greater detail.

The Emergency Stop (EMS) Switch 540 is located at the platform control station 315. When the EMS Switch 540 is activated, all power will be cut off to all functions.

When the personnel lift is powered on, all function inputs should be in the open (non-activated) position. If any function is active on power up, all functions will be inoperative and a fault will be indicated. Deactivating the function and turning off and then on will clear the fault.

When the personnel lift 200 is powered up, all functions will be operative if: a) a function is selected within a predetermined time, for example, a three second window, after the enable input is activated, or b) any other function was operated less than the predetermined time, i.e., less than three seconds. For the system according to the invention, one function corresponds to the drive mode, and another function corresponds to the lift mode.

When a function is operated, intermittent activation of the enable input 510 is ignored. Also, when a function is operated, permanent closure of the enable input 510 for more than a predetermined time, for example, ten seconds, will trigger a fault. However, the function will be allowed to continue to operate until it is terminated. At this time, all functions will be inoperative until the enable input 510 is cycled.

Referring now to FIG. 6, the drive forward mode is entered by the operator first pushing the enable button 510 at the platform control station 315, and then stroking the joystick 310 to a forward position (i.e., 12 o'clock position when viewing the joystick from above) within the three second window after the enable button 510 was pushed. When in the drive forward mode, the drive motors 5,7 ramp up to the forward speed selected (full speed, cutback speed, or variable input). When deselected, that is, when the joystick 310 is released by the operator, the controller module 300 receives this information over the control lines 320 that connect it to the platform control module 315. The controller module 300 then outputs signals to cause the DC motors 5,7 to slow down to a stop and the brakes are also applied. Depending upon whether the movable platform portion 220 of the personnel lift 200 is in it fully retracted position or not, as determined by the speed cutback input to the controller module 300, the desired forward or reverse speed of the personnel lift 200 may be cut back to some extent, or not allowed in its entirety. For safety reasons, when the personnel lift 200 is elevated, driving of the personnel lift 200 may only be allowed at a slower rate of speed, so as to maintain the stability of the personnel lift 200. These safety conditions are software programmable in the system according to the invention, and depending on the location (i.e., country) in which the personnel lift 200 is utilized, the safety factors may change.

For example, in one location, the drive function may be totally disallowed when the movable portion 220 of the personnel lift 200 is above a certain elevation, and in another location, the drive function may be allowed, but at a reduced speed. Based on the location in which the personnel lift 200 will be used, the controller module 300 can be programmed to allow certain operator inputs, to cut back certain operator inputs, or to curtail certain operator inputs based on the sensed inputs.

One of the sensed inputs is a ground control clearance input (not shown), which indicates whether a ground control clearance system has been activated. The ground control clearance input lowers the bottom clearance of the base portion 210 of the personnel lift 200 from about 2" to about ½". The controller module 300 is able to determine if the ground control clearance system is activated by monitoring the ground control clearance input. If the ground control clearance system is not set for some reason when the movable portion 220 of the personnel lift 200 was moved up from its fully retracted position, then drive movement of the personnel lift 200 will be curtailed for safety reasons.

Referring now to FIG. 6, the drive reverse mode is entered by the operator first pushing the enable button 510 at the platform control station 315, and then stroking the joystick 310 to a reverse position (i.e., 6 o'clock position when viewing the joystick from above) within the three second window after the enable button 510 was pushed. When in the drive reverse mode, the drive motors 5,7 ramp up to the reverse speed selected (full speed, cutback speed, or variable input). When deselected, that is, when the joystick 310 is released by the operator, the controller module 300 receives this information over the control lines 320 that connect it to the platform control module 315. The controller module 300 then causes the DC motors 5,7 to slow down to a stop and the brakes are also applied.

For both the drive forward and the drive reverse modes, if the joystick 310 was initially stroked at a time greater then three seconds after the enable button 510 was pushed, then the drive mode will not be entered. Thus, the operator must engage the joystick 310 within a predetermined time (three seconds in the preferred embodiment, but it can be programmed to any time and still be within the scope of the invention) in order to enter the drive mode.

The lift up mode is entered by the operator first pushing the enable button 510 at the platform control station 315, and then pushing the lift up button 520 at the platform control station 315 within the three second window. When in the lift up mode, the pump contactor 380 (see FIG. 7a) will close to place the voltage of the battery 260 on the pump motor 280, and the lift up valve 370 will open at a predetermined later time. In one example, the predetermined later time is one second. When deselected (i.e., when the operator lifts his/her finger off of the lift up button 520), the pump contactor 380 will open and the lift up valve 370 will close.

The lift down mode is entered by the operator first pushing the enable button 510 at the platform control station 315, and then pushing the lift down button 530 at the platform control station 315 within the three second window. When in the lift down mode, the lift down valve 375 will open. When deselected (i.e., when the operator lifts his/her finger off of the lift down button 530), lift down valve 375 will close.

The speed cutback input 392 (see FIG. 4) provides an input to the controller module 300, which indicates whether the movable portion 220 of the personnel lift 200 is at its fully retracted position or not.

The drive cutout input 390 provides an input to the controller module 300, which indicates whether the movable portion 220 of the personnel lift 200 is above a predetermined elevation.

The brake status input 394 provides an input to the controller module 300 as to whether the brakes 444, 446 (see FIG. 7a) are manually overridden.

Based on these sensed inputs, the controller module 300 either allows a particular operator input received, disallows a particular operator input received, or cuts back a particular operator input received, based on Table 1, given below.

TABLE 1

| Speed Cutback Switch | Drive Cutout | Brake Status | Controller Response |
|---|---|---|---|
| 0 | 0 | 0 | Drive & Lift Up Disabled |
| 0 | 0 | 1 | Drive Cutout |
| 0 | 1 | 0 | Drive & Lift Up Disabled |
| 0 | 1 | 1 | Speed Cutback |
| 1 | 0 | 0 | Drive & Lift Up Disabled |
| 1 | 0 | 1 | Full Drive |
| 1 | 1 | 0 | Drive & Lift Up Disabled |
| 1 | 1 | 1 | Full Drive |

*0 = open, 1 = closed.

In one example of the system according to the invention, the drive speed is cut back to 25% of its normal maximum value in the speed cutback mode. Table 2 lists the various effects of the limit switches being activated on drive and lift functions.

TABLE 2

| Function | Device | Activation | Effect |
|---|---|---|---|
| Speed Cutback | Limit Sw. | Mast Position (Lifted) | Drive Speed 25% |
| Drive Cutout | Limit Sw. | Mast Position (15' up) | Drive Speed 0% |
| Ground Clearance Switch | Limit Sw. | Ground Clearance System Deactivated | Drive Speed 0% |
| Brake Status | Limit Sw. | Manual Release | Error-Lift Down Only |
| Tilt Sensor | Relay | Out of Level | Error-Lift Down Only |
| Charger Interlock | Relay | AC to Charger | Drive Speed 0% |

The charger interlock input 395 is received by the controller module 300, and when in an active state, all drive functions are disabled by the controller module 300. The charger interlock input 395 informs the controller module 300 if AC power is being supplied by the charger 270. From Table 2, it is noted that the lift up and lift down functions are possible when the charger interlock input 395 is in its active state.

Another input given in Table 2 is the tilt sensor input (not shown in the figures), which informs the controller module 300 when the personnel lift is in a tilted condition (i.e., on a ramp). When the personnel lift 200 is in a tilted condition and the movable portion 220 of the personnel lift 200 is not fully retracted, only the lift down mode is allowed. When the personnel lift 200 is in the tilted condition, the drive mode is allowed only when the movable portion 220 of the personnel lift 200 is fully retracted.

When the joystick 310 is stroked, the direction of movement of the joystick 310 and the amount of movement from the center position are fed to the controller module 300. The rate of movement of the personnel lift 200 can be controlled at the platform control station 315 via a rotating switch, or potentiometer 561, which can be turned anywhere between a minimum position to a maximum position. This allows for the operator to control the minimum/maximum rate of drive movement of the personnel lift 200.

In the system according to the invention, the lift mode is performed by conventional hydraulics, and the drive mode is accomplished by a rear wheel drive system that provides an appropriate amount of energy to the left and right DC motors 5,7 in order to accomplish a particular driving movement. In the drive mode, the rate of ramping up or down can be modified via software control. Also, when the personnel lift 200 is turning in the drive mode, the controller module 300 cuts back the maximum allowable speed to about 70% of its maximum allowable speed when moving directly forward. Again, this value may be changed via software.

As described above, the front caster wheels 240 are rotatable in any direction (i.e., 360 degree range of movement), and are not controlled by the controller 300. The platform control station 315 has a battery status indicator 537, which appears as a ten-LED display (see FIG. 6). Based on the number of LEDs that are lit at any particular time, the operator is informed of the charging capacity of the battery 260.

In the system according to the invention, the controller module 300 is located in the base portion 210 of the personnel lift 200, but it could just as well be located in the movable portion 220 of the personnel lift 200. While the above control system handles both a lift mode and a drive mode, it could easily be adapted to handle a deck mode, in which a deck could be extended from the movable portion 220 of the personnel lift 200 to give greater range of movement for an operator. This "deck mode" would be enabled by an operator pressing the enable button 510, and then pressing a "deck mode" push button on the platform control station within the three second time limit.

While the above-described control system is used in a vertical mast personnel lift, it could equally be applied to other types of personnel lifts, such as a telescoping lift, a boom-type lift, an articulating lift, or a scissors lift.

While there has been illustrated and described what is at present considered to be exemplary embodiments according to the invention, it will be understood by those skilled in the art that various changes and modifications may be made, and equivalents may be substituted for elements thereof without departing from the true scope of the invention. In addition, many modifications may be made to adapt to a particular situation or material to the teachings of the invention without departing from the central scope thereof. Therefore, it is intended that this invention not be limited to the particular embodiments disclosed as the best mode contemplated for carrying out the invention, but that the invention will include all embodiments falling within the scope of the appended claims.

What is claimed is:

1. A drive control system for a personnel lift having a base portion and a movable portion, comprising:

first and second rear wheels fixedably mounted to a bottom surface of the base portion such that the first and second rear wheels rotate about a single axis, the single axis being substantially aligned with a widthwise axis of the base portion; and first and second motors respectively connected to the first and second rear wheels and configured to provide rotational movement of the first and second rear wheels, wherein the first and second motors are actuated to respectively rotate the first and second rear wheels to cause steering of the personnel lift without steering either one of the first and second rear wheels.

2. The drive control system as recited in claim 1, wherein the first rear wheel corresponds to a left rear wheel of the personnel lift, the second rear wheel corresponds to a right rear wheel of the personnel lift, and when an operator desires to make a right turning movement, the second motor is rotated at a slower rate then the first motor.

3. The drive control system as recited in claim 2, wherein the first and second motors are DC motors.

4. The drive control system as recited in claim 1, further comprising:
   a platform control station located on the movable portion and configured to receive operator inputs for one of a drive movement of the personnel lift and a lift movement of the movable platform;
   a control bus; and
   a controller module connected to the platform control station by the control bus and configured to output pulse width modulated (PWM) signals to the first and second motors to cause a desired driving movement of the personnel lift based on the received operator inputs over the control bus being for the drive movement.

5. The drive control system as recited in claim 4, wherein the control bus is a controller area network (CAN) bus.

6. The drive control system as recited in claim 5, wherein the controller module comprises:
   a CAN controller coupled to the CAN bus; and
   a master processor coupled to the CAN controller and to the first and second motors, the master processor configured to output the PWM signals to the first and second motors at a respective first and second rate depending on whether the movable portion is in a fully retracted position or not.

7. The drive control system as recited in claim 6, further comprising:
   sensing means for sensing an elevation condition of the movable portion, the sensing means being coupled to the master processor.

8. The drive control system as recited in claim 7, wherein the personnel lift includes a lift mechanism coupled to the base portion and the movable portion to cause the movable portion to be moved in a vertical direction, and wherein the sensing means includes:
   a first normally closed switch connected to the lift mechanism and configured to open when the movable portion is above a predetermined height above the base portion.

9. The drive control system as recited in claim 3, wherein the platform control station comprises:
   an enable button;
   a lift-up button;
   a lift-down button; and
   a spring-loaded joystick, the joystick being in a central position when not activated,
   wherein first, second, third and fourth signals respectively indicative of whether the enable button, the lift up button, or the lift down button was pushed by the operator, and a fifth signal indicative of a direction the joystick was actuated by the operator are sent to the controller module over the control bus.

10. A drive control system as recited in claim 1, wherein, in order to cause the personnel lift to revolve about a central position, the second motor is moved at a first rate and at a first rotational direction, and the first motor is moved at the first rate and at a second rotational direction opposite the first rotational direction.

11. A drive control system for a personnel lift having a base portion and a movable portion, comprising:

first and second rear wheels fixedably mounted to a bottom surface of the base portion such that the first and second rear wheels rotate about a single axis, the single axis being substantially aligned with a widthwise axis of the base portion;
first and second motors respectively connected to the first and second rear wheels and configured to provide rotational movement of the first and second rear wheels; and
first and second front wheels pivotably mounted to the bottom surface of the base portion and configured to rotate in any angular direction;
wherein the first and second motors are actuated to rotate the first and second rear wheels to cause steering of the personnel lift without steering either one of the first and second rear wheels, and wherein the first and second front wheels are free to rotate during the steering of the personnel lift and are not controlled by the drive control system.

12. The drive control system as recited in claim 11, wherein the first rear wheel corresponds to a left rear wheel of the personnel lift, the second rear wheel corresponds to a right rear wheel of the personnel lift, and when an operator desires to make a right turning movement, the second motor is rotated at a slower rate then the first motor.

13. The drive control system as recited in claim 12, wherein the first and second motors are DC motors.

14. The drive control system as recited in claim 11, wherein the first and second front wheels are caster wheels.

15. The drive control system as recited in claim 11, wherein when an operator desires to make a right turning movement, the second motor is rotated at a slower rate then the first motor.

16. The drive control system as recited in claim 11, further comprising:
   a platform control station located on the movable portion and configured to receive operator inputs for one of a drive movement of the personnel lift and a lift movement of the movable platform;
   a control bus; and
   a controller module connected to the platform control station over the control bus and configured to respectively output first and second pulse width modulated (PWM) signals to the first and second motors to cause a desired driving movement of the personnel lift based on the received operator inputs over the control bus.

17. The drive control system as recited in claim 16, wherein the control bus is a CAN bus.

18. The drive control system as recited in claim 17, wherein the controller module comprises:
   a CAN controller coupled to the CAN bus; and
   a master processor coupled to the CAN controller and to the first and second motors, the master processor configured to respectively output the first and second PWM signals to the first and second motors at a first and second rate depending on whether the movable portion is in a fully retracted position or not.

19. The drive control system as recited in claim 11, further comprising:
   sensing means for sensing an elevation condition of the movable portion, the sensing means being coupled to the master processor.

20. The drive control system as recited in claim 19, wherein the personnel lift includes a lift mechanism coupled to the base portion and the movable portion to cause the movable portion to be moved in a vertical direction, and wherein the sensing means includes:

a first normally closed switch connected to the lift mechanism and configured to open when the movable portion is above a predetermined height above the base portion.

21. A method for moving a personnel lift having a base portion and a movable portion, the personnel lift including a first and a second rear wheel fixed in a direction of movement with respect to the base portion, and the personnel lift having first and second front wheels pivotably mounted to the base portion, the method comprising the steps of:

a) receiving an operator input of a desired driving movement of the personnel lift; and b) based on the received operator input, sending a first signal to a first motor coupled to the first rear wheel and a second signal to a second motor coupled to the second rear wheel to cause the desired driving movement, wherein the first and second front wheels of the personnel lift are not controlled during the driving movement.

22. The method as recited in claim 21, wherein the first and second signals are PWM signals, and when a right turn is the desired driving movement, the first signal has a larger pulsewidth than the second signal, and wherein the second rear wheel corresponds to a right rear wheel of the personnel lift and moves at a slower rate than the first rear wheel which corresponds to a left rear wheel of the personnel lift, and when a left turn is the desired driving movement, the first signal has a smaller pulsewidth than the second signal, and wherein the second rear wheel moves at a faster rate than the first rear wheel.

23. The method as recited in claim 21, wherein the first and second front wheels are caster wheels.

24. The method as recited in claim 21, wherein when one of a direct forward and a direct reverse driving movement is desired, the first signal has an identical pulsewidth as the second signal, which causes the second rear wheel to move at substantially a same rate as the first rear wheel.

* * * * *